Nov. 5, 1929.  J. W. LEGG  1,734,217
OSCILLOGRAPH
Original Filed Oct. 10, 1925  2 Sheets-Sheet 1
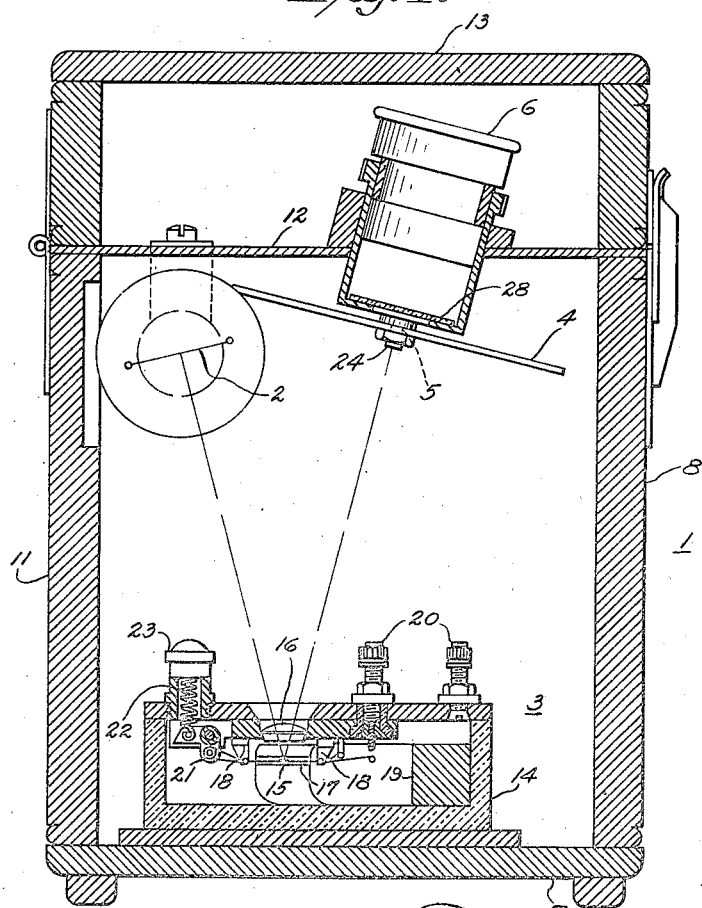
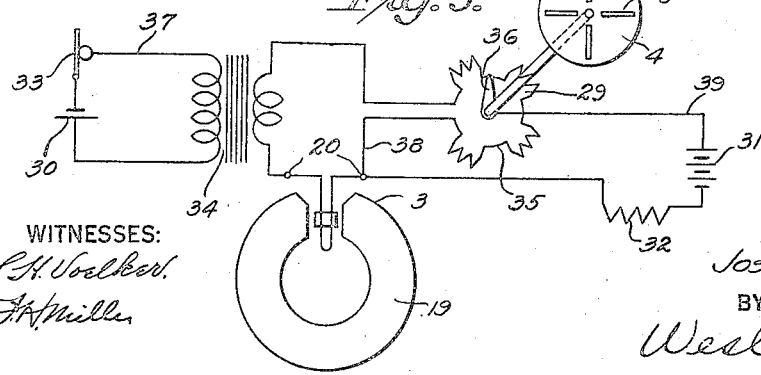
INVENTOR
Joseph W. Legg.
BY
Wesley G. Carr
ATTORNEY

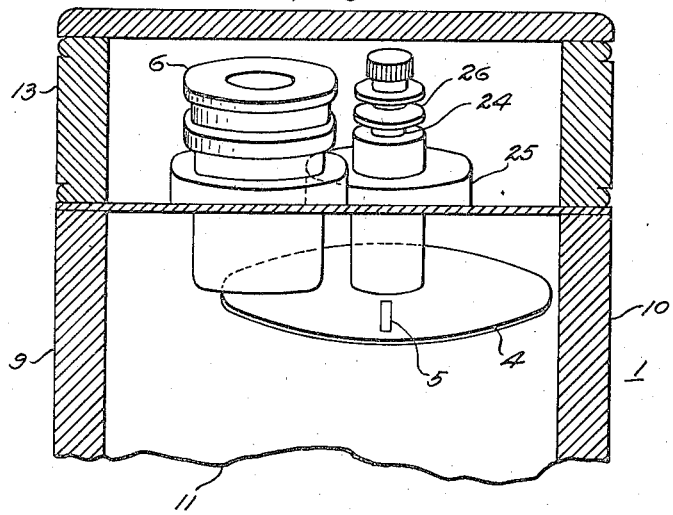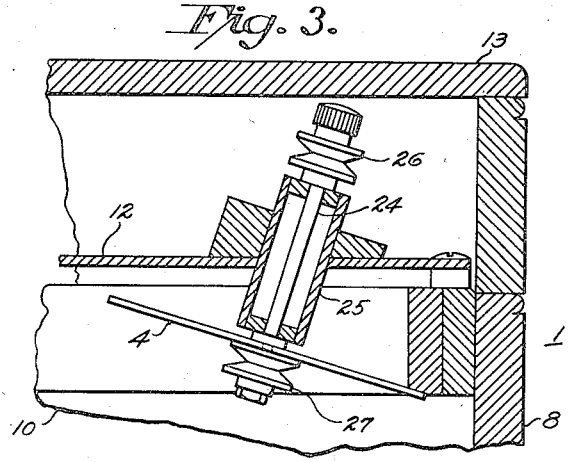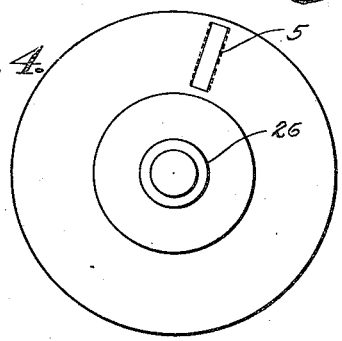

Patented Nov. 5, 1929

1,734,217

UNITED STATES PATENT OFFICE

JOSEPH W. LEGG, OF WILKINSBURG, PENNSYLVANIA, ASSIGNOR TO WESTERN ELECTRIC & MANUFACTURING COMPANY, A CORPORATION OF PENNSYLVANIA

OSCILLOGRAPH

Application filed October 10, 1925, Serial No. 61,810. Renewed May 13, 1929.

My invention relates to oscillographs and particularly to oscillographs of the portable type.

It is characteristic of my invention that a galvanometer deflecting or vibratory system is actuated or deflected in accordance with a characteristic, as magnitude, of a quantity, either electrical or non-electrical in character.

One object of my invention is to reduce the size and the weight of portable, visual oscillographs, and to render the same simple, compact and durable in construction, economical to manufacture and effective in operation.

Another object of my invention is to provide means by which audio-waves, may be translated into light vibrations enabling deaf persons to comprehend sound.

Another object of my invention is to provide means for the translation of electrical waves into light waves in such manner that they may be utilized in television.

A further object of my invention is to provide an instrument which can operate by means of a small portable battery for a source of energy and for this reason may easily be transported.

The invention is an electric translating instrument comprising a moving cylindrical condensing lens and light shield in a light and compact oscillograph.

Heretofore, oscillographs have comprised stationary lenses and oscillating mirrors. The image is projected from the stationary lens to the mirror, from which it is reflected to the focal plane of a viewing means. The elongated projection required to include the mirror has increased the relative size of the image to such magnitude that the light from the source could not be focused to a point, thus requiring a very strong source of light to give a sufficient intensity in the image on the viewing means.

In accordance with my invention, the cylindrical lens is moved transversely of the path of the light-beam reflected from the vibrating mirror and a lens of relatively great curvature is used to bring the pencil of light from the mirror to a focus in a very small image, thus requiring only a small source of light.

Figure 1 of the accompanying drawings is an elevational view of an oscillograph device embodying my invention, Fig. 2 is a perspective side view of the upper part of the oscillograph showing the moving condensing lens and light shield and the viewing means.

Fig. 3 is an elevational view of the upper part of the oscillograph embodying the moving condensing lens and light shield.

Fig. 4 is a top view of the moving cylindrical condensing lens and light shield; and Fig. 5 is a diagrammatic view of a modified form of my invention.

The device of my invention comprises, in general, a casing 1, a source of light 2, a galvanometer 3, a light shield 4, a condensing lens 5 and a viewing means 6.

The casing 1 is constructed of wood, although it may be constructed of any other suitable material, such as sheet metal or insulating material, and comprises a base plate 7, to which the galvanometer 3 is attached, a front or face plate 8, side panels, 9 and 10, rear-wall portion 11 and a top member 12 which carries a lamp socket for the source of light 2, viewing means and light shade and condensing lens. The main portions are joined integrally to preclude the ingress of light and a cover 13 is provided to protect the portions which project above the top member 12.

The source of light 2 is provided with a base or socket member which is carried by the top member 12 and comprises a straight-line light source for the galvanometer 3 for a purpose to be hereinafter described.

The galvanometer 3 comprises a fluid-tight, oil-filled casing 14, disposed at the lower portion of the casing 1, containing a horizontally-disposed galvanometer mirror element 15 in the magnetic field of a permanent magnet 19; it is located beneath a lens 16, situated in the upper wall of the galvanometer casing. The mirror is mounted on a vibrating element 17 which is suspended over two ivory bridges 18 affixed to the galvanometer casing 14. The extremities of the vibrating element are attached to terminals 20 that receive the current carrying the actuating pulsations of electricity. An ivory pulley 21 sustained by a spring 22 holds the loop end of the vibrating element and maintains a constant tension in it, which is governed by the tension applied to the spring 22 by a screw 23.

The light shield 4 is a round plate of radius sufficiently large to include the condensing lense 5 to be hereinafter described, rotating on a shaft 24 which is held by a bearing 25 attached to the top member 12 of the casing 1. The plate is constructed of brass or any other suitable material, preferably heavy in weight. The shaft 24 is fitted, both at the top and bottom, with pulley wheels 26 and 27 in order that it may be rotated by a small motor (not shown) located either inside the casing 1 or outside the same, or by hand.

The cylindrical condensing lens 5 is inset in the light shield in a radial direction and is of sufficient length to include the oscillations of light reflected from the galvanometer mirror 15, and of sufficient width to admit a large amount of light, without undue distortion, to the desired point image of light. The focal length of the lens should be short in order that the image resulting from the pencil reflected by the galvanometer from the lamp be as small and bright as practicable.

The viewing means, an eye piece 6 of a usual microscopic type, is disposed in an opening in, and is affixed to, the top member 12 of casing 1 and is so located that its focal plane conforms to the focal plane of the rotary condensing lens and at such a place in that plane that the reflected light from the galvanometer mirror will strike it when the light is permitted to pass by the condensing lens 5.

A clear glass 28 attached to the lower portion of the viewing means, is disposed in the focal plane thereof. A properly calibrated scale is etched on the glass, providing means by which the light waves may be measured.

In operation, leads of a circuit carrying audio-waves are attached to terminals 20. The source of light 2 may be supplied with current from a small portable battery. Rays of light are emitted from the straight-line source 2, striking the lens 16 which condenses them on the galvanometer mirror 15 where they are bent by the oscillations which are in accordance with the audio wave pulsations and reflected back through the lens 16 which refracts them to a pencil and directs them to the light shield 4 in front of the viewing means 6.

When the light shield is rotated by the application of a force to a pulley 26 or pulley 27, either by hand or by a motor, the cylindrical condensing lens is passed through the line of vision of the viewing means 6. Rays of light, originating in the straight-line source and reflected from the galvanometer mirror 15, are progressively condensed as a moving point and are thus integrated into a light wave by the eye focused through the viewing means. By this means, there is a visual image of the audio-wave with each rotation of the condensing lens with the light shield.

The speed of rotation of the lens and light shield may be rapid when the light waves are uniformly recurrent because they may be superposed upon each other without distortion but, if the light waves are not uniformly recurrent, as in the case of most translated audio-waves, then the eye can behold them only one at a time without confusion. The persistence of vision of the eye is not substantially greater than fifteen changes per second; consequently, with irregular waves, the eye could not perceive more than fifteen images per second without interference, and the speed of the rotation of the light shield and lens could not be more than fifteen rotations per second.

If the frequency of the actuating pulsations desired to be translated is so great that the above described apparatus cannot present a sufficient number of characteristic waves, the adaptation of the inventive idea shown in Fig. 5 provides a means whereby apparently simultaneous, non-interfering, multiple waves may be secured.

This modification of my invention comprises, in general, in variation to the above described elements, a light shield 4 and four cylindrical condensing lenses 5 and, in addition, a potentiometer 29, two batteries, 30 and 31, a resistor 32 a carbon microphone 33, and a transformer 34.

The light shield 4 is similar to that hereinbefore described but there are inset in it, at right-angle radial positions, four cylindrical condensing lenses 5, as, hereinabove described, except that they may require greater length.

The potentiometer 29 comprises a four-stage circular resistor 35 and a rotatable brush 36 that is driven synchronously with the rotatable light shield 4. The normal position of the brush 36 is such that it is in quarterly positions on the circular resistor 35 when a lens 5 is passing through the focal plane of the viewing means.

The two batteries 30 and 31 are small portable dry batteries, the battery 30 comprising a small number of cells, and the battery 31 comprising a relatively large number of cells. The resistor 32 has many times the resistance of the potentiometer 29 and the microphone 33 is of a usual type of carbon microphone. The transformer 34 is an audio-frequency transformer with fewer turns on the secondary than on the primary to increase the induced current.

Three circuits 37, 38 and 39 comprise the elements enumerated. The circuit 37 includes the carbon microphone 33, the battery 30 and the primary coil of the transformer 34 which induces the audio-waves into the secondary coil with increased current values. The circuit 38 includes this secondary coil of the transformer 34, the circular resistor 35 and the galvanometer 3. The circuit 39 includes the potentiometer 29, the battery 31, the resistor 32 and the secondary coil of the transformer 34, and is joined to circuit 38 at a galvanometer terminal 20 and the potentiometer brush 36; the battery supplies the current in an amount governed to a high degree by the resistor 32 but varied within limits by the varying resistance of the rotatable potentiometer 29 which is driven at a synchronous speed with the light shield by small gears or a belt. This varying current is carried by the circuit 38 to the galvanometer which is proportionately polarized thereby. The polarization must be of sufficient magnitude to tilt the galvanometer mirror 15 far enough to present the multiple images focused by the multiple lenses 5 in the same manner as hereinbefore described for a single lens 5 in parallel non-interfering waves in the focal plane of the viewing means 6.

In operation the light shield 4 and the potentiometer brush 36 rotate at synchronous speeds. A first lens 5 passes the viewing means 6 when the brush 36 is at its full-resistance position and the minimum current is flowing in the circuit 38. The brush 36 has traversed one-fourth of the resistor 35 by the time a second lens is passing the viewing means, the current in circuit 38 is increased, thus tilting the mirror 15 by polarization of the galvanometer. In a similar manner, the galvanometer mirror is tilted further as each of the two remaining lenses 5 passes the viewing means 6.

Thus, the mirror 15 is rocked to displace the rays from the source of light 2 which it reflects toward the viewing means. If the light shield 4 is rotated with a frequency similar to the persistency of vision, four light waves are simultaneously visible to an eye focused through the viewing means 6, in parallel, non-interfering positions.

My invention provides a means of translating audio-waves into light waves in a greatly simplified manner, the number of parts is reduced to fewer than the number required by similar instruments in the prior art, the efficiency of the source of light is so increased by the shortened focal length of the condensing lens that a lamp may be used which depends on a small dry battery for its supply of current.

By the invention, a simple, efficient and compact oscilloscope is produced which is capable of translating audio-waves into light waves. The characteristics of the translated audio-waves of letters and syllables are so distinct that a trained eye can understand sound by sight. The sensitivity of the human eye is such that it can grasp the characteristics of a sound by visualizing one or two of the waves which must be repeated dozens of times to arouse sympathetic vibrations of the bones in the ear. By this means, deaf persons may be educated to understand sound by visualization of audio waves.

My copending application Serial No. 12,928, filed September 13, 1928, which is a division of application Serial No. 752,427, filed Nov. 26, 1924, and is assigned to the Westinghouse Electric & Manufacturing Company, describes and claims apparatus for making a vibrating beam of energy appear as a plurality of waves.

I claim as my invention:

1. An electric translating instrument comprising viewing means, a source of light, movable means for focusing rays of light from said source directly upon the focal plane of the viewing means, and means for vibrating said rays of light in synchronism with applied electric pulsations.

2. An electric translating instrument comprising viewing means, a source of light, rotatable means cooperating therewith for focusing rays of light from said source directly upon the focal plane of the viewing means, and means for vibrating said rays of light in accordance with applied electric pulsations.

3. The combination in an oscillograph of a source of light, means for displacing light rays from said source, viewing means, and rotatable means adapted to focus said displaced light rays into multiple images in the focal plane of said viewing means.

4. The combination with means for passing a beam of light along a predetermined path, of means for deflecting said beam of light in accordance with a characteristic of a quantity, viewing means with which said beam of light coacts, and means movable transversely of said path for focussing said beam of light substantially as a point of light for movement along a focal plane removed from said viewing means.

5. The combination with means for passing a beam of light along a predetermined path, of means for vibrating said beam of light in accordance with a varying electrical quantity, a light shield movable transversely of said path, and a condensing lens carried by said light shield and movable substantially concentrically with respect to the axis of movement of said light shield.

6. The combination with means for passing a beam of light along a predetermined path, of means for vibrating said beam of light in accordance with variations in an electrical quantity, a rotatable light shield movable transversely of said path, a condensing lens carried by said light shield, and viewing means eccentrically positioned with respect to the axis of said light shield.

7. The combination with galvanometer mechanism including a vibratory system, of means for passing a beam of light to said system and thence along a predetermined path, means for vibrating said system in accordance with variations in an electrical quantity, means comprising a plurality of condensing lenses movable in succession transversely of said path and with which said beam of light coacts, and means timed with said last-named means for controlling the position of said vibratory system.

8. The combination with galvanometer mechanism including a vibratory system, of means for passing a beam of light to said system and thence along a predetermined path, means for vibrating said system in accordance with variations in an electrical quantity, rotatable means comprising a plurality of condensing lenses movable in succession transversely of said path and with which said beam of light successively coacts, means timed with said last-named means for controlling the position of said vibratory system, and viewing means eccentrically positioned with respect to the axis of said rotatable means.

9. The combination with galvanometer mechanism including a vibratory system, of means for passing a beam of light to said system and thence along a predetermined path, means for vibrating said system in accordance with variations in an electrical quantity, means comprising a plurality of condensing lenses movable in succession transversely of said path and with which said beam of light coacts, and means timed with said last named means for successively and progressively tilting said vibratory system from its normal position.

10. The combination with galvanometer mechanism including a vibratory system, of means for passing a beam of light to said system and thence along a predetermined path, means for vibrating said system in accordance with variations in an electrical quantity, means comprising a plurality of condensing lenses movable in succession transversely of said path and with which said beam of light coacts, and means timed with said last-named means and comprising an electrical circuit including a resistor for successively and progressively tilting said vibratory system from its normal position.

11. The combination with galvanometer mechanism including a vibratory light-reflecting mirror occupying a normal selected position, means for vibrating said mirror in accordance with variations in an electrical quantity, and means for moving and temporarily retaining said mirror in a position removed from said first-named position.

12. The combination with galvanometer mechanism including a vibratory system positioned in a predetermined plane, means for vibrating said system in accordance with variations in an electrical quantity, and means for positioning said vibratory system in a plane angularly related with respect to said first-named plane.

13. The combination with galvanometer mechanism including a vibratory system positioned in a predetermined plane, means for vibrating said system in accordance with variations in an electrical quantity, and means for successively and progressively tilting said vibratory system into a plurality of planes each angularly related with respect to said first-named plane.

14. The combination with galvanometer mechanism including a vibratory system positioned in a predetermined plane, means for vibrating said system in accordance with variations in an electrical quantity, and means comprising an electrical circuit including a resistor for successively and progressively tilting said vibratory system from said first-named plane.

15. The combination with galvanometer mechanism including a vibratory system comprising a light-reflecting mirror positioned in a predetermined plane, of means for vibrating said system by an electrical current and in accordance with variations thereof, and means for positioning said light-reflecting mirror in a plane angularly related to said first-named plane during continuation of the action of said electrical current on said vibratory system.

16. The combination with galvanometer mechanism including a vibratory system comprising a light-reflecting mirror positioned in a predetermined plane, of means for vibrating said system by an electrical current and in accordance with variations thereof, and means for successively and progressively tilting said light-reflecting mirror into a plurality of planes each angularly related to said first-named plane during continuation of the action of said electrical current on said vibratory system.

17. The combination with galvanometer mechanism including a vibratory system positioned in a predetermined plane, of means for vibrating said system in accordance with variations in an electrical quantity, and means comprising stationary and rotating elements of an electrical circuit for successively and progressively tilting said vibratory system from said first-named plane, one of said elements comprising a plurality of units.

18. The combination with galvanometer mechanism including a vibratory system positioned in a predetermined plane, of means for vibrating said system in accordance with variations in an electrical quantity, and means comprising stationary and rotating elements of an electrical circuit for successively and progressively tilting said vibratory system from said first-named plane, one of said elements comprising a resistor formed from a plurality of units.

19. The combination with means for passing a beam of light along a predetermined path, of means for deflecting said beam of light in accordance with a characteristic of a quantity, means movable transversely of said path for focusing said light-beam substantially as a point of light for movement along a plane angularly related with respect to said path, and means for viewing the wave form traced by said point of light, said focusing means moving at such high velocity that the wave form appears to persist after passage of said focusing means from the field of vision of said viewing means.

20. The combination with means for passing a beam of light along a predetermined path, of means for deflecting said beam of light in accordance with a characteristic of a quantity, a condensing lens movable transversely of said path for focusing said light-beam substantially as a point of light for movement along a plane angularly related with respect to said path, and means for viewing the wave form traced by said point of light, said condensing lens moving at such high velocity that the wave form appears to persist after passage of said condensing lens from the field of vision of said viewing means.

21. The combination with means for passing a beam of light along a predetermined path, of means for vibrating said beam of light in accordance with a varying electrical quantity, a rotatable light shield movable transversely of said path, and a condensing lens carried by said light shield.

22. The combination with means for passing a beam of energy along a predetermined path, of means for vibrating said beam of energy in accordance with a varying electrical quantity, and means for making said vibrating beam of energy appear as a plurality of waves side by side.

23. Electrical apparatus comprising means for passing a beam of light along a predetermined path, means including a galvanometer-deflecting-element for vibrating said beam of light in accordance with a varying electrical quantity, a receiving means for indicating the vibration of said beam of light, and means for shifting the datum or zero of vibration of said reflected beam of light during the continuance of the mirror vibrations, whereby a plurality of images are produced on the receiving means by one and the same deflecting element.

24. The combination with means for passing a beam of light along a predetermined path, of means for vibrating said beam of light in accordance with a varying electrical quantity, viewing means in the path of said beam of light, and means for making said vibrating beam of light appear in said viewing means as a plurality of waves side by side.

25. In combination with a single galvanometer-deflecting element and a viewing means, means for altering the character of the current sent through said element at a rate at least as great as the persistency of human vision, and means for impressing the electrical quantity to be studied upon said element during the intervals between said alterations in the character of said current.

26. The combination with means for passing a beam of light along a predetermined path, of means including a galvanometer-deflecting element for deflecting said beam of light in accordance with a varying electrical quantity, viewing means comprising a plurality of viewing elements, and means for imparting an additional deflection to said beam of light each time one of said viewing elements moves into the path of said beam of light, whereby said beam is brought into a new position corresponding to the viewing element just moved into the path of said beam of light.

27. The combination with means for passing a beam of light along a predetermined path, of means including a galvanometer-deflecting element for vibrating said beam of light in accordance with a varying electrical quantity, viewing means comprising a plurality of viewing elements, and means for passing a different quantity of direct current through said deflecting element each time one of said viewing elements moves into the path of said beam of light.

28. In electrical apparatus, a circuit comprising a galvanometer-deflecting element, a circuit including a source of alternating current in series with the said element, and a second circuit including a source of direct current connected in parallel with a portion of said first named circuit.

29. Electrical apparatus comprising a straight-line source of light, a light shield, a cylindrical lens carried by said light shield, means for forming a real image of said light source in a plane near said light shield, means for deflecting the beam of light which forms said real image, and means for moving said cylindrical lens through said beam of light with the axis of said cylindrical lens approximately at right angles to the plane of said beam of light.

In testimony whereof, I have hereunto subscribed my name this 24th day of September, 1925.

JOSEPH W. LEGG.

CERTIFICATE OF CORRECTION.

Patent No. 1,734,217.             Granted November 5, 1929, to

JOSEPH W. LEGG.

It is hereby certified that the above numbered patent was erroneously issued to "Western Electric & Manufacturing Company, a Corporation of Pennsylvania", whereas said patent should have been issued to "Westinghouse Electric & Manufacturing Company, a Corporation of Pennsylvania" as shown by the records of assignments in this office; and that the said Letters Patent should be read with this correction therein that the same may conform to the record of the case in the Patent Office.

Signed and sealed this 3rd day of December, A. D. 1929.

(Seal)
M. J. Moore,
Acting Commissioner of Patents.